United States Patent
Martin et al.

(10) Patent No.: US 7,209,763 B2
(45) Date of Patent: Apr. 24, 2007

(54) SYSTEM AND METHOD FOR CONDUCTING A DISPATCH MULTI-PARTY CALL AND SIDEBAR SESSION

(75) Inventors: David Martin, Chantilly, VA (US); Karalyn Szuszczewicz, Haymarket, VA (US); Trinh Vu, Ashburn, VA (US)

(73) Assignee: Nextel Communications, Inc., Overland Park, KS (US)

( * ) Notice: Subject to any disclaimer, the term of this patent is extended or adjusted under 35 U.S.C. 154(b) by 0 days.

(21) Appl. No.: 11/227,358

(22) Filed: Sep. 15, 2005

(65) Prior Publication Data

US 2006/0063551 A1 Mar. 23, 2006

Related U.S. Application Data

(60) Provisional application No. 60/610,559, filed on Sep. 17, 2004.

(51) Int. Cl.
*H04Q 7/20* (2006.01)
*H04M 3/42* (2006.01)
*H04B 7/00* (2006.01)

(52) U.S. Cl. .................. 455/519; 455/518; 455/416

(58) Field of Classification Search ............... 455/466, 455/518, 519, 521, 416; 370/62
See application file for complete search history.

(56) References Cited

U.S. PATENT DOCUMENTS

| | | | | |
|---|---|---|---|---|
| 5,473,605 | A * | 12/1995 | Grube et al. | 370/261 |
| 6,236,854 | B1 * | 5/2001 | Bradshaw, Jr. | 455/416 |
| 6,553,236 | B1 | 4/2003 | Dunko et al. | |
| 6,957,077 | B2 * | 10/2005 | Dehlin | 455/466 |
| 2006/0030347 | A1 * | 2/2006 | Biswaas | 455/518 |

\* cited by examiner

*Primary Examiner*—Tilahun Gesesse

(57) ABSTRACT

In an embodiment of a method of the present invention, the method includes the acts of establishing a dispatch multi-party call between a set of communication devices and establishing a sidebar communication between a subset of the set of communication devices. The set of communication devices participate in the dispatch multi-party call and only the subset of communication devices participate in the sidebar communication. In an embodiment of a system of the present invention, the system includes a dispatch network and a set of communication devices in communication with the dispatch network. The dispatch network establishes a dispatch multi-party call between the set of communication devices and a sidebar communication between a subset of the set of communication devices, wherein the set of communication devices participate in the dispatch multi-party call and only the subset of communication devices participate in the sidebar communication.

28 Claims, 1 Drawing Sheet

SYSTEM AND METHOD FOR CONDUCTING A DISPATCH MULTI-PARTY CALL AND SIDEBAR SESSION

This application claims the benefit of U.S. Provisional Patent Application Ser. No. 60/610,559, filed Sep. 17, 2004, the entire disclosure of which is herein expressly incorporated by reference.

FIELD OF THE INVENTION

The present invention relates generally to the field of telecommunications, and in particular, to dispatch calling services.

BACKGROUND OF THE INVENTION

Cellular communications systems typically provide inter-connect and/or dispatch voice communication services. Interconnect voice communication services are those typically provided by most cellular carriers as circuit-switched communications. Dispatch communication services are commonly known as a "walkie-talkie" type of call, such as provided by Nextel Communications, Inc. and identified by the trade names Push-To-Talk (PTT) or Direct Connect. The popularity of dispatch calls is ever expanding and this increase in popularity has created a demand for more features to be associated with these types of calls.

Currently, dispatch communication services can typically provide private and group calls. A private dispatch call is between two parties, while a group dispatch call is between more than two parties, each of whom can converse with each of the other participants during the call. However, a potential drawback with group calls, in certain circumstances, is that all participants are able to hear all conversations between all parties. There may be occasions when two or more of the participants desire to privately discuss an issue while still being able to listen to the communications in the group call. However, in these circumstances, currently, there is no capability for the parties of the dispatch group call to have a separate, private conversation while still participating in the dispatch group call.

Therefore, it would be desirable to provide an improved system and method for conducting dispatch multi-party calls. The improved system and method could provide for the capability to participate in a dispatch multi-party call while conducting a private session with another participant in the multi-party call.

SUMMARY OF THE INVENTION

A system and method for conducting a dispatch multi-party call and sidebar session is provided. In accordance with an embodiment of a method of the present invention, the method includes the acts of establishing a dispatch multi-party call between a set of communication devices and establishing a sidebar communication between a subset of the set of communication devices. The set of communication devices participate in the dispatch multi-party call and only the subset of communication devices participate in the sidebar communication.

In accordance with an embodiment of a system of the present invention, the system includes a dispatch network and a set of communication devices in communication with the dispatch network. The dispatch network establishes a dispatch multi-party call between the set of communication devices and a sidebar communication between a subset of the set of communication devices, wherein the set of communication devices participate in the dispatch multi-party call and only the subset of communication devices participate in the sidebar communication.

DETAILED DESCRIPTION OF THE EXEMPLARY EMBODIMENTS

Figure 1:
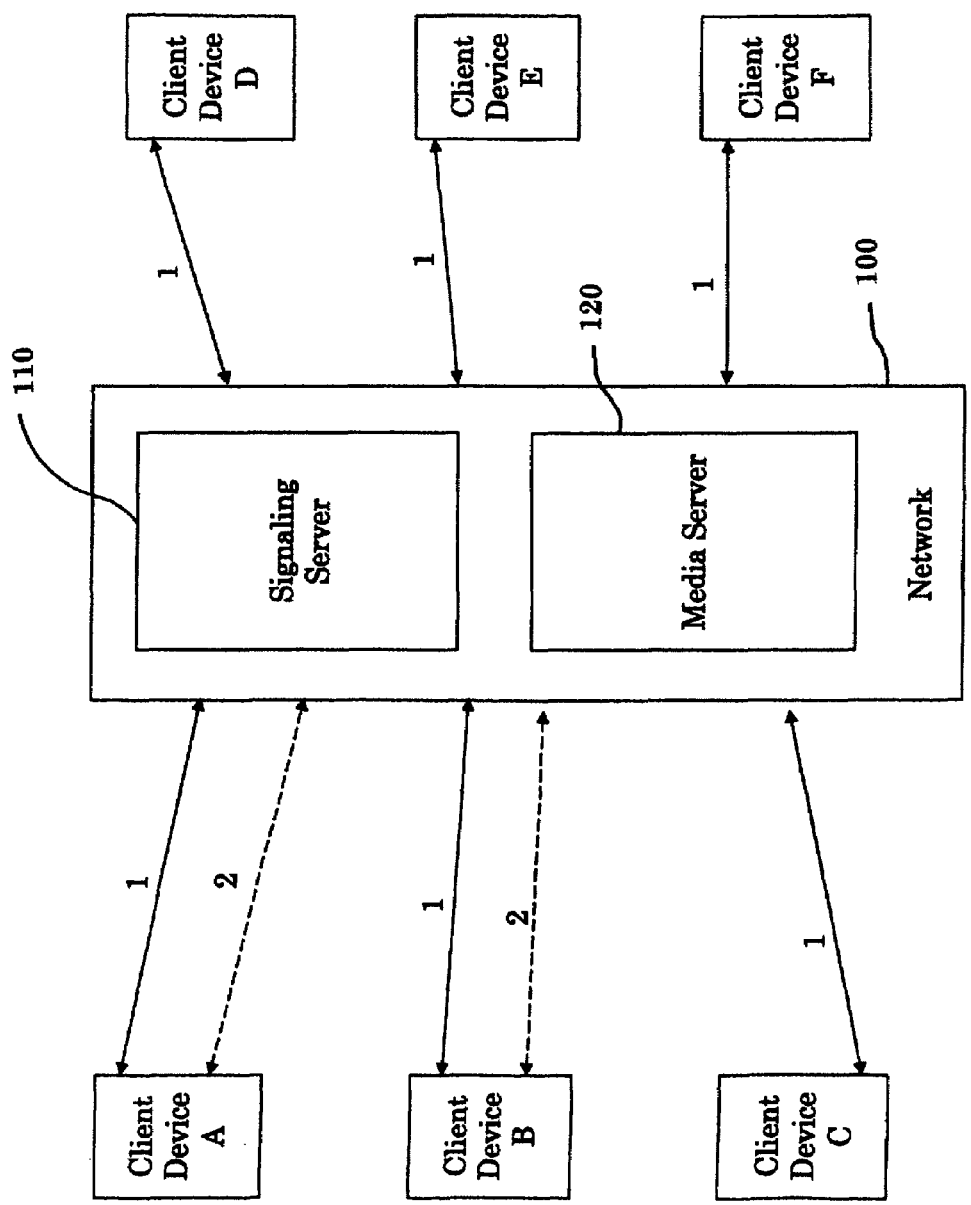
FIG. 1 illustrates an exemplary system and method for conducting a dispatch multi-party call and sidebar session in accordance with the principles of the present invention.

FIG. 1 illustrates an exemplary system and method in accordance with an embodiment of the present invention. As illustrated, client communication devices A–F are participants in a dispatch group call that is carried over dispatch telecommunications network 100. The communication devices can be mobile telephones, IP-based telephones, desktop computers, or any other device capable of communications. As discussed previously, dispatch communications are "walkie-talkie" types of calls that are half-duplex communications between the parties to the group call. One type of such calls are the push-to-talk (PTT) calls as provided by Nextel Communications, Inc.

The dispatch network 100 establishes and supports the group call using dispatch signaling server 110 and dispatch media server 120. Signaling server 110, among other functions, performs call set-up, floor control and access, and call termination functions for the dispatch communication session. As such, signaling server 110 accomplishes all of the signaling required between the communication devices to support the group call. Media server 120 allocates resources in dispatch network 100 to support the group call, e.g., network processor and memory resources. Whereas only signaling server 110 and media server 120 are represented in dispatch network 100, dispatch network 100 includes many other components, systems, and sub-systems which are not required to be illustrated here for an understanding of the present invention by one skilled in the art. For example, in an embodiment, dispatch network 100 also includes a session initiation protocol (SIP) register.

A dispatch group call can be established by dispatch network 100 by either consulting a pre-defined list of members in a group or forming an ad-hoc group, i.e., a group that is not defined prior to the group call. When initiating a group call to a pre-defined group, all members of the group are automatically participants in the call without requiring further designation. For example, a network subscriber can establish a group for his golf buddies that includes each member of the group. When the subscriber desires to have a group call with these buddies, all of the buddies are automatically participants in the group call when the call is initiated. For an ad-hoc group call, the calling party can designate the other subscribers that are desired for participation in the call. However, regardless of how the dispatch group call is established, the present invention can be practiced in any type of dispatch group call.

As illustrated in FIG. 1, a dispatch group call 1 has been established by dispatch network 100 between participants A–F. In this group call, any of the participants A–F can talk with any other participant and all participants can hear the conversation(s) between any of the other participants. The communications between all participants in this dispatch group call are half-duplex communications. As is well known, a half-duplex call only permits one party at a time to speak.

In accordance with exemplary embodiments of the present invention, if two or more of the participants of the dispatch group call desire to hold a private dispatch discussion, they can initiate a dispatch sidebar call. The dispatch sidebar call involves establishment of another dispatch call between a sub-group of the participants in the group call while the sidebar call participants are still part of the group dispatch call. However, whereas the sidebar call participants can hear the dispatch group call, the group call participants cannot hear the sidebar call. Maintaining the group dispatch call and the dispatch sidebar call can be referred to as a multi-session for the participants.

The dispatch sidebar call is illustrated in FIG. 1 by the signaling paths designated by reference numeral 2. In this example, a sidebar dispatch call 2 is established between participants A and B while these participants are still part of dispatch group call 1. In an embodiment, the group dispatch call 1 can be attenuated and mixed with the dispatch sidebar call such that the participants of the dispatch sidebar call can continue to monitor the group dispatch call. In this embodiment, the dispatch group call is combined with the dispatch sidebar call for participants A and B. The volume of the dispatch group call is reduced to a level that is lower than the dispatch sidebar call such that the group call is still audible, but yet, is not so loud that it interferes with the participants being able to hear the sidebar dispatch call. In an alternative embodiment, the group dispatch call is completely muted. Participants A and B are still participants in the dispatch group call, however, the audio for the call is muted. The present invention is not limited to any particular methodology for either attenuating or muting the group dispatch call. This functionality can be performed by a participant in the sidebar call by pressing a key on their respective communication device. Alternatively, this functionality can be pre-programmed into media server 120. For example, media server 120 could be programmed such that any time participant A is involved in a sidebar dispatch call the group call is either attenuated or muted, based on the desires of participant A and as programmed into media server 120.

The present invention is also not limited to either attenuating or muting the group dispatch call for all participants in the sidebar call. For example, sidebar call participant A may want to mute the group call while sidebar participant B may want to attenuate the group call. Therefore, muting or attenuating the dispatch group call is a user configurable option which can vary between the participants of the dispatch sidebar call and can be accomplished either by the participant using the communications device or by pre-programming the media server.

The present invention is not limited to how the dispatch group call and the sidebar call are provided to the participants' communication devices by dispatch network 100. For example, as discussed previously, the dispatch sidebar call can be mixed with the group dispatch call by media server 120 within dispatch network 100 such that the group call and the sidebar call are combined as a single audio output. If the calls are mixed in the network by the media server, the single audio output is then carried over a single communication channel to the sidebar participants' communication devices. Alternatively, the dispatch sidebar call can be carried separately over the same or a different communication channel to the communication devices and the communication devices would then mix the audio streams to combine them into a single audio output. Whether the dispatch sidebar call and the group dispatch call are mixed in the network or within the communication device is a user configurable option and can vary for different participants of the dispatch sidebar call. For example, assume that communication device A is a computer with a broadband connection to network 100 while communication device B is a cellular telephone with a conventional RF link to the network. Because bandwidth is a more limited resource in an RF channel than in a broadband channel, it may be desirable for communication device B to receive the dispatch sidebar call and the dispatch group call mixed by the network while communication device A receives the two calls as separate data streams to be mixed by the computer.

It may be desirable to receive the two calls as separate data streams to be mixed by the communication device, e.g., a computer. In this embodiment, the user may have more flexibility in how the two calls are mixed. For example, the user may want flexibility in how the group dispatch call is mixed with the sidebar call. If the group dispatch call is delivered as separate audio to the communication device, the user can mix it with the sidebar call, for example, at various volume levels, at select times during portions of the group call and not at others, or when certain speakers are speaking and not when other speakers are speaking. The ability to mix the calls at the communication device could provide more flexibility to the user in configuring how the audio streams are mixed.

However, the determination as to whether the group dispatch call and the sidebar dispatch call are mixed at the dispatch network or at the communication device may depend on several factors other than bandwidth availability. For example, the processing power of the communication device could be a factor. If a computer is the communication device, the computer should have sufficient processing capability to perform the mixing function. However, if the communication device is a phone it may not have sufficient resources to perform the mixing function and, thus, for this particular device, the mixing may have to be performed by the dispatch network. Therefore, the selection of where to perform the mixing function may depend upon the particular communication device used by a party to the sidebar call.

An additional consideration for determining how and where to perform the mixing function may be based on the types of communications for the group call and the sidebar call. For example, if the group call is a dispatch call and the sidebar call is also a dispatch call, a communication device would only need a processor, or media coder/decoder (codec), that could process this type of media. Therefore, it may be feasible to perform the mixing in the communication device if the two calls are of the same media type, assuming other resources are adequate in the device as well. However, if the two calls are of different media types, then the mixing function may need to be handled in the network. For example, if the group call is a dispatch call and the sidebar call is a telephone interconnect, or circuit-switched, call, then the calls may need to be mixed at the network due to the greater processing power that may be required and the requirement to handle the different media types.

Therefore, because of the various ways that the calls may be handled, it may be desirable to provide a user profile in the network that could be utilized by the network to optimally determine how the functionality of participating in a group call and a sidebar call can be performed. For example, during call set-up the user could designate to the network that the user is utilizing a phone as a communication device. The network is also able to determine what type of media is being utilized for the group call and the sidebar call. Based on the network knowing the communication device being used by the user and the media type(s) being utilized in the session, the network could determine the optimal way for conducting the session. The profile can either be pre-defined in the network for future sessions or can be set-up by the user prior to initiation of any particular session.

The present invention is not limited to any particular methodology for establishing a sidebar call during a group call. All that is required is that a user be capable of requesting that a sidebar call be established with one or more other participants in the group call during the group call. For example, soft keys can be utilized in the communication device to establish a sidebar call and designate the other participant(s) in the sidebar call. The group call participants that are requested to participate in the sidebar call are notified, using audible and/or visual indicators, that they have received a sidebar call/message. Soft keys can also be utilized to allow the participants of the dispatch sidebar call to communicate with the participants in the dispatch group call at any time. When the sidebar call is completed, the sidebar messaging/voice application is closed.

Further with respect to establishing the sidebar call, by using a softkey, the initiator of the sidebar call can view a list of the parties currently involved in the group call and select a party(s) for participation in the sidebar call. A softkey can be utilized to initiate the sidebar call with the selected party(s). In an embodiment, the call is initiated by sending an invite to the selected party. The invite may be via text or an audible or visible signal. The selected party is a participant only if he/she accepts the invitation. Thus, forced audio interruptions, which may be caused by participation in a sidebar call, are avoided for participants in the group call unless they accept an invitation to join a sidebar call. Once involved in a sidebar call, the sidebar participants can toggle back and forth between participating in the sidebar call and the group call.

Whereas an embodiment of the present invention includes mixing of the group call and the sidebar call to produce a single mixed audio output, the present invention is not limited to mixing the two calls in order for a sidebar call to be conducted in conjunction with a group call. For example, the group call could be established and maintained as a separate communication from the sidebar call. In this embodiment, the communication device could output both the group call and the sidebar call by using circuitry appropriate for each. Thus, both calls could be separately output on the communication device and the user could adjust the output of each to meet the desires of the user.

Although an embodiment of the present invention has been described above in connection with dispatch calls and interconnect calls, the present invention can be utilized with any media for the sidebar call or format for the group call. For example, all that is required for the group call is that it broadly be a multi-party communication. This multi-party communication can be either a "group call" or a dispatch chatroom. A "group call" is generally known as a dispatch call between a defined group which can be either pre-defined or selectively dynamically defined. In a dispatch chatroom call, participants are able to join and participate in the call without being a member of a defined group. Additionally, the sidebar call is not required to be a voice communication, e.g., dispatch call or interconnect call. Alternatively, the sidebar communication could be a non-voice communication such as a data or text communication session, such as an instant messaging session (IM), a Short Message Service (SMS) text message, Multimedia Messaging (MMS), and 2Way messaging.

Further in an alternative embodiment, the sidebar call is not required to be conducted between participants of the multi-party call. A participant of the multi-party call may desire to have a sidebar communication with a party that is not a participant of the multi-party call, while still participating in the multi-party call. In an embodiment, the media server would mix the multi-party call and the sidebar communication for the participant in the sidebar call that is also a participant in the multi-party call and would only provide the sidebar communication to the non-participant of the multi-party call, such that it is in effect, for example, a private dispatch call.

The disclosed embodiments are illustrative of the various ways in which the present invention may be practiced. Other embodiments can be implemented by those skilled in the art without departing from the spirit and scope of the present invention.

What is claimed is:

1. A method for conducting a dispatch multi-party call, the method comprising the acts of:
    establishing a dispatch multi-party call between a set of communication devices;
    establishing a sidebar communication between a subset of the set of communication devices, wherein the sidebar communication is established in a format other than a dispatch call format;
    maintaining a profile of a participant in the sidebar communication in a dispatch network; and
    determining by the dispatch network a method for conducting the sidebar communication with the participant based on the profile;
    wherein the set of communication devices participate in the dispatch multi-party call and wherein only the subset of communication devices participate in the sidebar communication.

2. The method of claim 1 wherein the dispatch multi-party call is a group call.

3. The method of claim 2 wherein the set of communication devices is defined by a participant in the group call prior to establishing the group call.

4. The method of claim 2 wherein the set of communication devices is selectively dynamically defined by a participant in the group call in conjunction with establishing the group call.

5. The method of claim 1 wherein the dispatch multi-party call is a chatroom.

6. The method of claim 1 further comprising the act of mixing the dispatch multi-party call and the sidebar communication to produce a single audio output.

7. The method of claim 6 wherein the act of mixing is performed in a dispatch network.

8. The method of claim 6 wherein the act of mixing is performed in the subset of communication devices.

9. The method of claim 6 wherein the act of mixing is performed in a dispatch network for a first communication device of the subset of communication devices and wherein the single audio output is provided to the first communication device from the dispatch network and further wherein the act of mixing is performed for a second communication device of the subset of communication devices in the second communication device.

10. The method of claim 6 wherein the act of mixing includes the act of attenuating the dispatch multi-party call.

11. The method of claim 6 wherein the act of mixing includes the act of muting the dispatch multi-party call.

12. The method of claim 1 wherein the sidebar communication is an interconnect call.

13. The method of claim 1 wherein the sidebar communication is a text message session.

14. The method of claim 1 further comprising the act of notifying a communication device of the subset of communication devices of the establishment of the sidebar communication.

15. The method of claim 14 wherein the act of notifying includes providing an audible tone.

16. The method of claim 14 wherein the act of notifying includes providing a visible signal.

17. The method of claim 1 further comprising the act of inviting a communication device of the subset of communication devices to participate in the sidebar communication.

18. The method of claim 1 wherein the sidebar communication is a non-voice communication.

19. A system for conducting a dispatch multi-party call, comprising:
   a dispatch network; and
   a set of communication devices in communication with the dispatch network;
   wherein the dispatch network establishes a dispatch multi-party call between the set of communication devices and a sidebar communication between a subset of the set of communication devices, wherein the sidebar communication is established in a format other than a dispatch call format;
   wherein the dispatch network maintains a profile of a participant in the sidebar communication and wherein the dispatch network determines a method for conducting the sidebar communication with the participant based on the profile;
   and wherein the set of communication devices participate in the dispatch multi-party call and wherein only the subset of communication devices participate in the sidebar communication.

20. The system of claim 19 wherein the dispatch multi-party call is a group call.

21. The system of claim 19 wherein an identification of the set of communication devices is stored in the dispatch network.

22. The system of claim 19 wherein the dispatch multi-party call is a chatroom.

23. The system of claim 19 wherein the dispatch network mixes the dispatch multi-party call and the sidebar communication to produce a single audio output.

24. The system of claim 19 wherein the subset of communication devices mixes the dispatch multi-party call and the sidebar communication to produce a single audio output.

25. The system of claim 19 wherein the dispatch network mixes the dispatch multi-party call and the sidebar communication to produce a first single audio output for a first communication device of the subset of communication devices and wherein the first single audio output is provided to the first communication device from the dispatch network and further wherein a second communication device of the subset of communication devices mixes the dispatch multi-party call and the sidebar communication to produce a second single audio output for the second communication device.

26. The system of claim 19 wherein the sidebar communication is an interconnect call.

27. The system of claim 19 wherein the sidebar communication is a text message session.

28. The system of claim 19 wherein the sidebar communication is a non-voice communication.

* * * * *